Jan. 12, 1960 P. M. G. TOULON ET AL 2,921,211

IMAGE REPRODUCTION DEVICE

Filed Feb. 23, 1955 3 Sheets-Sheet 1

WITNESSES

Edwin G. Bassler

Charles F. Renz

INVENTORS
Pierre M. G. Toulon &
Francis T. Thompson
BY
F. E. Browder
ATTORNEY

IMAGE REPRODUCTION DEVICE

Filed Feb. 23, 1955

Jan. 12, 1960

P. M. G. TOULON ET AL 2,921,211

IMAGE REPRODUCTION DEVICE

Filed Feb. 23, 1955

3 Sheets-Sheet 3

2,921,211

IMAGE REPRODUCTION DEVICE

Pierre M. G. Toulon, Turtle Creek, and Francis T. Thompson, Pittsburgh, Pa., assignors to Westinghouse Electric Corporation, East Pittsburgh, Pa., a corporation of Pennsylvania Application February 23, 1955, Serial No. 490,026
3 Claims. (Cl. 313—70)

This invention relates to the transmission, reception and reproduction of electrical communication signals and more particularly to television image signals.

The principal object of this invention is to reduce the width of the frequency band required for the transmission of electrical signals or to increase the definition of a television image with a given bandwidth.

The present television system adopted in the United States is comprised of 525 horizontal lines scanned 30 times a second and the video bandwidth is limited to 4.25 megacycles per second. Rather than transmit 30 images per second, which would produce objectionable flicker, it was decided to scan twice as many images per second with half the number of lines per image and thus retain the bandwidth of 4.25 megacycles per second. The present system calls for the odd numbered lines to be scanned in one field in one sixtieth of a second and the even numbered lines to be scanned in the next field in one sixtieth of a second so that a complete frame (two fields) of 525 lines is scanned in one thirtieth of a second. This method of scanning is known as vertical interlace and is utilized in the system adopted in the United States.

The phosphor utilized on the screen of the image reproduction tube has a persistence or decay time such that the luminescence drops almost to zero in one thirtieth of a second or the time for one complete frame. If the decay time were longer, the flicker effect would be reduced but there would be smudging of rapidly moving objects in the image. The persistence of the human eye gives the observer the effect that the screen of 525 lines is presented in one instant.

The bandwidth of 4.25 megacycles per second limits the number of resolvable elements of definition presented along each of the horizontal scanning lines to about 450 assuming an 83% active horizontal scanning time. This results from the fact that the bandwidth of 4.25 megacycles is equal to the horizontal lines scanned per field (262.5) times the fields scanned per second (60) times half the elements per each horizontal scanned line (450/2) multiplied by the per unit active horizontal scanning time (.83). In order to reduce the bandwidth with the same definition or to increase the definition with the same bandwidth, it is necessary that one of the determining factors of bandwidth be modified.

In comparison with successive-line frame scanning in which each field contains the total number of lines, the conventional two field vertical interlace allows better utilization of video information and is a first step in the reduction of the bandwidth. To attempt to further decrease the lines per field and still retain the 525 lines per frame and 60 fields per second would result in flicker due to the short decay time of presently used phosphors. However, the physiological factor of the human eye can be utilized to further reduce bandwidth without loss of definition. It has been found that where the reproduced scene is of low detail in shade or where rapid movement is involved, the observer requires less definition.

It has also been found that a horizontal interlace system may be utilized whereby a plurality of dots are presented along one horizontal line in one field and then in a later field the area between the dots of the first field are presented so as to form essentially a dot interlace along each horizontal line. The horizontal dot interlace system in combination with present vertical interlace requires at least four fields to complete a frame and may utilize even a larger number. The horizontal interlace system also suffers from the same problem associated with the vertical interlace in that where more than two fields per frame are utilized objectionable flicker may be found due to the short decay time of the present phosphors.

It is accordingly an object of this invention to provide an improved television system to combine the advantages of horizontal and vertical interlace scanning to reduce the required bandwidth for a suitable high definition image.

It is another object to provide an improved television system to present a high definition image to an observer with a given bandwidth.

It is another object to provide an improved television system which utilizes a low definition and high definition scan within a television raster.

It is another object to provide an improved television system capable of reproducing an image on a cathode ray tube screen having different decay time light producing elements.

It is another object to provide an improved image reproduction tube utilizing two electron beams of different spot size.

It is another object to provide an improved image reproduction tube having a screen comprised of phosphors of different decay times.

It is another object to provide a means for separately or simultaneously exciting at will a plurality of phosphors having different decay times.

It is another object to provide a signal from the transmitter which allows the selection of the desired light producing area at the receiver.

It is another object to make an analysis of the redundancies in video information between adjacent picture elements in a given frame and/or between corresponding elements in successive frames.

It is another object to form and transmit a signal concerning these redundancies preferably in a compatible manner.

It is another object to recover the redundancy information from this signal at the receiver.

It is another object to provide a means to use this redundancy signal at the receiver to select a phosphor of the proper time decay for displaying each video information.

It is another object to provide means to use this redundancy signal at the receiver to alter the spot size used for displaying each video information.

These and other objects are effected by our invention as will be apparent from the following description taken in accordance with the accompanying drawings throughout which like reference characters indicate like parts, and in which.

Figures 1, 2, 5:
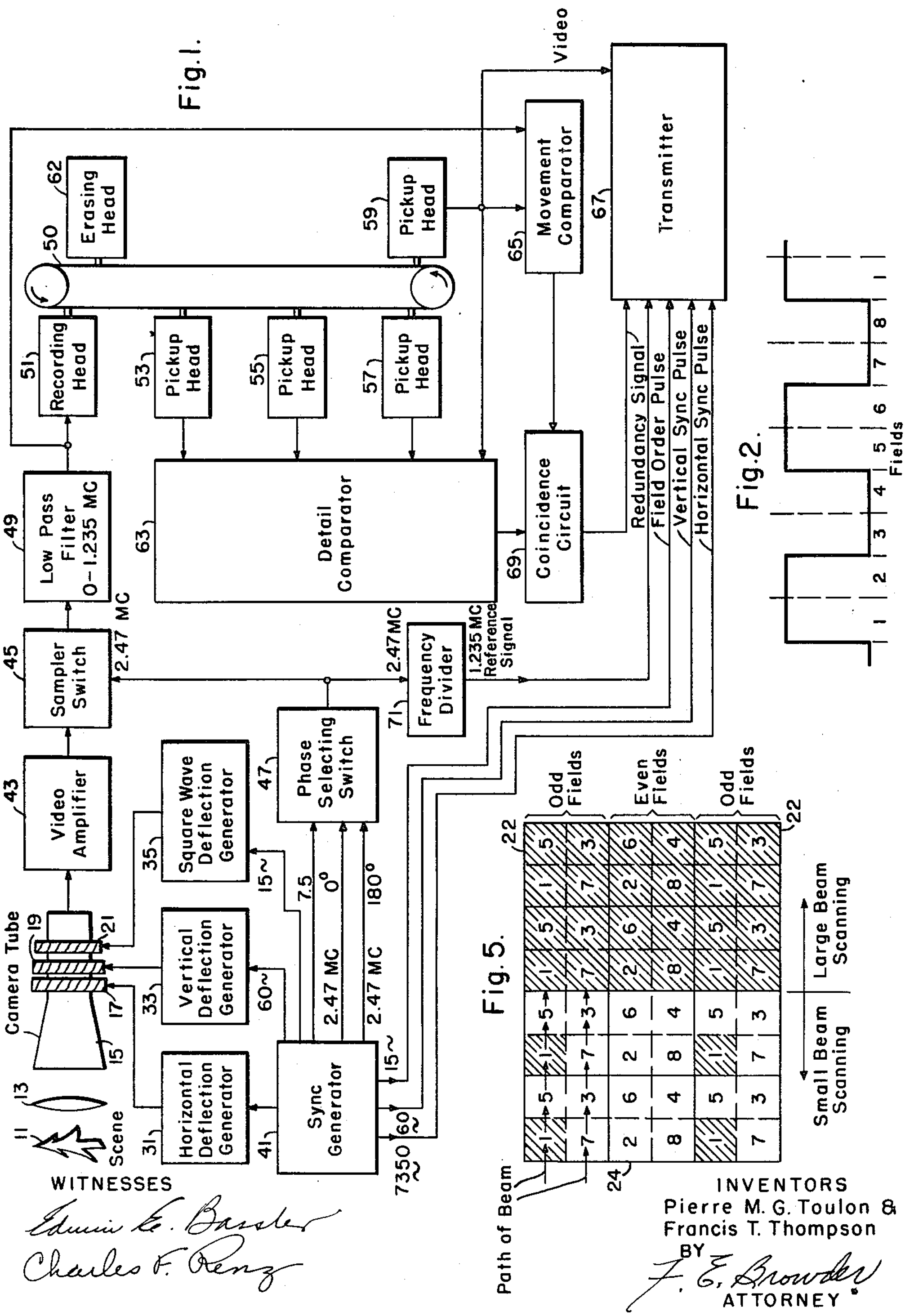
Figure 1 is a block diagram of a television transmission system embodying our invention.
Fig. 2 is the graphical representation showing the relative positioning of the electron beam in the scanning raster in different fields.
Fig. 5 is a graphical illustration showing a portion of the face plate of a cathode ray tube with superimposed picture elements and beam trace areas.

Referring in detail to Fig. 1, there is illustrated a television transmitting system. The light from an object or scene 11 is focused by suitable optical means 13 on to the photosensitive cathode of a suitable television camera tube 15. The camera tube 15 illustrated herein is of the well known image orthicon type. It will be clear to those skilled in the art that other types of camera tubes may be employed in the practice of this invention with equal facility.

The camera tube 15 is provided with the usual deflection system in the form of horizontal and vertical deflection coils 17 and 19. In addition to the usual deflection system, an auxiliary coil 21 is also provided around the neck of the camera tube 15 which allows the raster to be vertically displaced a distance equal to one-fourth the distance between two lines which are successively scanned during a single field. The horizontal deflection coil 17 is provided with a horizontal deflection generator 31 of suitable type and driven at a frequency of 7350 cycles per second. The vertical deflection coil 19 is also provided with a suitable deflection generator 33 of a frequency of 60 cycles per second. The auxiliary deflection coil 21 is provided with a deflection generator 35 of a frequency of 15 cycles per second. The wave shape of the auxiliary deflection generator 35 is square and by means of the auxiliary deflection coil 21 allows the raster to be displaced during vertical retrace time and held in this displaced position during the scanning of two fields. The output wave form of the generator 35 is shown in Fig. 2. In one type of scan, as will be described for the purposes of explaining our invention, the raster is displaced upward in fields 1, 2, 5 and 6 and downward in fields 3, 4, 7 and 8. The position of the raster in each field is indicated in Fig. 2 to aid in further explanation of the scanning raster.

The horizontal and vertical deflection generators 31 and 33 are controlled by separate sync signals provided from a synchronizing signal generator 41. The square-wave deflection generator 35, which consists of a multivibrator, such as described in "Waveforms," First edition, by Chance, Hughes, et al., published by McGraw-Hill Book Co., is provided with a 15 cycle per second and a 7.5 cycle per second synchronizing pulses in order to synchronize and properly order the deflection of the scanning raster. The purpose of this additional vertical deflection is to increase the vertical interlace to a ratio of 4:1.

The output of the camera tube 15 is fed to a video amplifier 43 and the output thereof is fed to a sampler switch 45, which is a high-speed electronic switch. The sampler switch 45, a suitable type of which is described in Television Engineering, by Donald G. Fink, published by McGraw-Hill Book Co., 2nd edition, may be thought of as a rotary switch rotating at 2.47 million revolutions per second. This switch 45 allows the video information from the video amplifier 43 to pass to a low pass filter 49 during 180° of rotation and permits no video information to pass during the other 180°. The frequency and phase of the sampler switch 45 is controlled by a 2.47 megacycles per second signal fed to the sampler switch 45 from a phase selector switch 47. The phase selector switch 47 consists of a synchronized switch, such as described in previously mentioned reference Television Engineering, by Fink. The sync generator 41 also provides two equal amplitude signals of a frequency of 2.47 magacycles per second, differing in phase by 180° to the phase selecting switch 47. The phase selecting switch 47 conects one of these 2.47 megacycles per second signals to the sampler switch 45. The phase selector switch 47 is synchronized by a 7.5 cycle per second signal from the sync generator 41 so that the proper phase for each entire field is switched during the vertical retrace time of the scanning raster. The purpose of the phase selecting switch 47 and sampler switch 45 is to provide a 2:1 horizontal dot interlace scan. It will be obvious to those skilled in the art that the phase selecting switch 47 may be eliminated if a sampling frequency which is an odd multiple of one-half the line scanning frequency of the electron beam is chosen to directly feed the sample switch 45.

The output of the sampler switch 45 is fed to the low pass filter 49 having a band pass of 0 to 1.235 megacycles per second. The output of the low pass filter 49 consists of an envelope of sampled video from the sampler switch 45. It is desirable to examine a portion of the raster scanned by the camera tube tube 15 to understand and describe the remaining portion of the transmission system.

Figures 3, 4, 6, 7, 11:
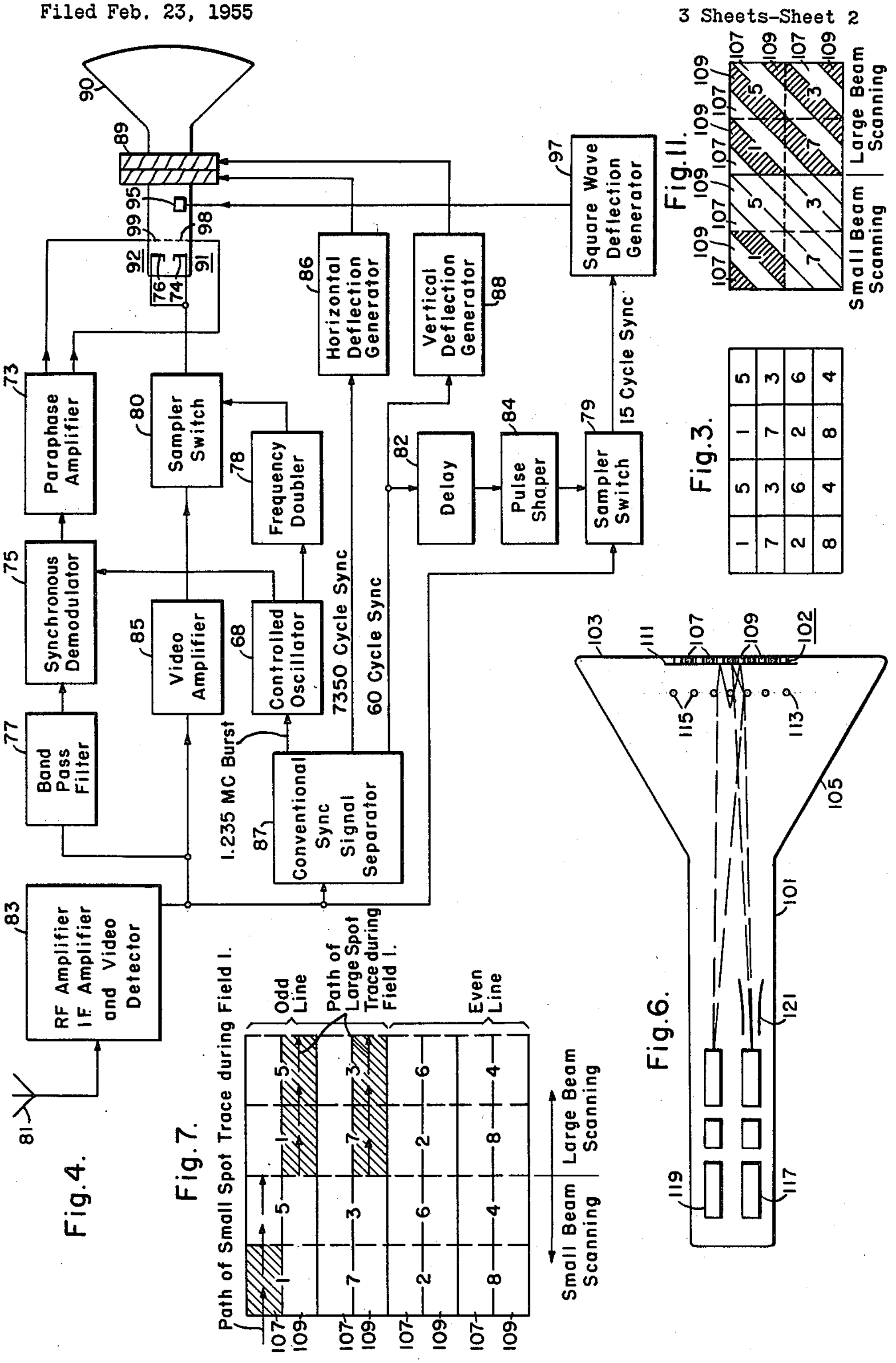
Fig. 3 is a graphical illustration showing a portion of the face plate of the pickup tube with superimposed picture elements thereon for purposes of explaining the invention.
Fig. 4 is a block diagram of a television receiving system embodying our invention.
Fig. 6 is a schematic view of a cathode ray tube embodying our invention.
Fig. 7 is a graphical illustration showing a portion of the face plate of the tube illustrated in Fig. 6 for purposes of explaining the invention.
Fig. 11 illustrates another possible phosphor arrangement on the face plate of a pickup tube.

Referring in detail to Fig. 3, a portion of the raster is shown divided into eight sets of picture elements. The number designated on each of the elements on the raster corresponds to the field in which the video information from this particular element is obtained by means of the recording electron beam. In order to obtain a 4:1 vertical and a 2:1 horizontal interlace, it is necessary that eight fields be scanned to complete one frame. Thus during one field of the eight field frame, video information is obtained from all of the elements labeled 1 in Fig. 3. During field two of the eight field cycle or frame, the video information is obtained from all the elements labeled 2. The remaining information to complete a frame is obtained from the other elements in a similar manner during the remaining six fields. The order of element presentation shown is only one of the possible combinations and is shown for purposes of explanation.

The video information from the low pass filter 49 is fed to a recording head 51 such as described in an article entitled "A System For Recording and Reproducing Television Signals" by Olson, Houghton, et al., RCA Review March 1954, and is recorded on a video tape 50 having a high frequency response of at least 1.235 megacycles per second. An element of video information moves from the recording head 51 by means of the tape 50, to pickup head 53, to pickup head 55, to pickup head 57, to pickup head 59 and is then removed from the tape 50 by means of an erasing head 62. The speed of the tape 50 is carefully synchronized and the heads are located so that there is an exact two field delay between each of the following: heads 51 and 53, heads 53 and 55, heads 55 and 57, heads 57 and 59. To explain the function of this system of heads and tape, assume that field number one is being scanned and that the video information being recorded by the recording head 51 at this given instant of time is obtained from element 1 in the upper left-hand corner of Fig. 3. In this same instant of time, the video information from pickup heads 53, 55 and 57 are those informations which are recorded in the previous eight field frame from the adjacent elements 7, 5 and 3, respectively. The information obtained at this instant from pickup head 59 is that information which was recorded from the same element 1 during field 1 of the previous eight field cycle. The video information from heads 53, 55, 57 and 59 which corresponds to the video intelligence on adjacent elements 7, 5, 3 and 1, respectively, is simultaneously fed into a detail comparator 63. The detail comparator 63 consists of three differential amplifiers as described in the reference "Waveforms" by Chance, Hughes, et al. These three differential amplifiers perform the operation of subtracting the video intelligence of head 53 from head 59, head 55 from head 59, and head 57 from head 59, respectively. An output is thus obtained from the detail comparator 63 only if a difference other than zero is obtained from any of the differential amplifiers. A zero output from the detail comparator 63 indicates that the video values from the elements 1, 3, 5 and 7 are identical. An output from the detail compartor 63 indicates that one of the elements 7, 5 or 3 differs from element 1 and, therefore, that there is high detail information present in the scanned portion of the raster represented by the four elements 1, 3, 5 and 7 in the left-hand top corner of Fig. 3.

The output of the low pass filter 49 is also connected directly to a movement comparator 65. The movement comparator 65 functions in a similar manner to the detail comparator and compares the video signal derived from the low pass filter 49 with a signal derived from pickup head 59. These video signals derived from the low pass filter 49 and the pickup head 59 are obtained from the same picture element in the raster for two successive frames. Referring again to Fig. 3, element 1 in the left-hand top corner is scanned only once a frame and the movement comparator 65 compares the video intelligence obtained from this element in successive frames and, therefore, determines whether motion has taken place within element 1 from the preceding frame. If there is no difference in video output, then there will be no signal derived from the differential amplifier in the form of the movement comparator 65.

The video information that is to be transmitted to the receiver is derived from pickup head 59 and connected to a suitable transmitter 67. The outputs from the detail comparator 63 and the movement comparator 65 are fed to a coincidence circuit 69. The coincidence circuit 69 consists essentially of a dual controlled pentode tube such as a 6AS6, in which the output from the detail comparator 63 is fed to the control grid while the output of the movement comparator 65 is fed to the suppressor grid of the tube. The control grid of the tube is biased so that the tube is cut off unless there is a signal obtained from the detail comparator 63. The suppressor grid of the tube is biased so that the tube is cut off only if there is a signal from the movement comparator 65. It is, therefore, seen that an output is derived from the coincidence circuit 69 only if there is an output derived from the detail comparator 63 and no output from the movement comparator 65. This signal derived from the coincidence circuit 69 will hereafter be referred to as a redundancy signal. If either of the conditions set forth is not met, then there will be no output or redundancy signal obtained from the coincidence circuit 69. The existence of a redundancy signal output from the coincidence circuit 69 corresponds to a condition of high detail and no movement within the scene scanned by the camera tube 15. The redundancy signal from the coincidence circuit 69 is fed to the transmitter 67 where it is used to modulate the redundancy subcarrier which has a frequency of 1.235 megacycles and transmitted in a compatible manner similar to the NTSC color signal during the active horizontal scanning time. If there is an output from the coincidence circuit the redundancy subcarrier will be transmitted 180° out of phase with respect to the reference burst. If there is no output from the coincidence circuit the redundancy subcarrier will be transmitted in phase with the reference burst. The vector representing the phase of the redundancy carrier need only rotate in one direction to reach these two positions. It will be evident to those skilled in the art that this suppressed carrier redundancy signal need only have one sideband. By choosing the redundancy subcarrier frequency to be an odd multiple of one-half the line scanning frequency it is possible to interleave the subcarrier and luminance informations similar to the well known NTSC color technique and thereby allow the highest frequency transmitted to be limited to the color subcarrier frequency of 1.235 megacycles.

The sync generator 41 provides a horizontal sync pulse at a rate of 7,350 cycles per second to the transmitter 67 and is impressed on the transmitted signal during the horizontal or line retrace period. The sync generator 41 also provides a vertical sync pulse at the rate of 60 cycles per second to the transmitter 67 and is impressed on the transmitted signal during the vertical or field retrace period. The 2.47 megacycles per second output signal from the phase selecting switch 47 is frequency divided by means of a frequency divider 71 to obtain a 1.235 megacycles per second reference signal which is also connected to the transmitter 67 and transmitted as a reference burst on the back porch of the horizontal synchronizing signal in a manner similar to the NTSC color burst. The sync generator 41 also provides a field order sync pulse at a rate of 15 cycles per second to the transmitter 67 and is transmitted by a suitable method. One method that may be utilized to transmit this field order sync pulse is during the time that the first line of each field is scanned. Instead of transmitting video information during the first line of each field, a black or white level signal is transmitted. During the first line of the first and fifth fields of the eight cycle frame, the white level is transmitted while the black level is transmitted during the first line of the other six fields. The value of video corresponding to the white level and the black level is described in the Fink reference, "Television Engineering."

Referring in detail to Fig. 4, there is shown a block diagram of a suitable receiver embodying the invention. The audio system is of any suitable type in both receiver and transmiter and is not shown herein to reduce the complexity. The signal transmitted from the transmitting system previously described with respect to Fig. 1 is received by a suitable antenna 81 and applied to a television receiver. The signal obtained from the antenna 81 is connected to a radio frequency amplifier, an intermediate frequency amplifier, and a video detector as represented by the block 83.

A sync signal separator 87 recovers the 60 cycle per second sync pulse, the 7350 cycle per second sync pulse and 1.235 megacycles per second burst from the output of the video detector in a conventional manner. The 60 cycle vertical sync pulse and the 7350 cycle horizontal sync pulse are used to maintain the proper relationships of the horizontal and vertical generators 86 and 88, respectively, which deflect the beam or beams of a cathode ray tube 90 in a conventional manner. The cathode ray tube 90 is of suitable type and is conventional with the exception that two guns 91 and 92 and an auxiliary deflection means 95 are provided.

The 60 cycle vertical sync pulse is delayed by means of a delay line 82 and then shaped by a pulse shaper 84, such as described in the reference by Chance, Hughes, et al., so as to obtain a narrow square pulse. This square pulse obtained from the pulse shaper 84 is positive during the time that the first line of each field is scanned and negative at all other times. This pulse is fed from the pulse shaper 84 to a sampler switch 79 which operates at a 60 cycle rate and allows only the black and white levels transmitted during the first line of each field to pass. The polarity of the output of the sampler switch 79 is chosen so that the black level corresponds to zero output while the white level corresponds to full output. Therefore, an output pulse is obtained from the sampler switch 79 only when white level is transmitted during the first line. This output pulse which has a repetition rate of 15 times per second is used to synchronize the square-wave deflection generator 97 which is similar to the square-wave generator 35 described with reference to Fig. 1. The output wave form of this generator 35 is shown in Fig. 2.

The 1.235 megacycle burst signal from the sync separator 87 is used to synchronize a 1.235 megacycle oscillator 68 using the same technique that is used in NTSC color television receivers to obtain the color reference signal from the color burst. This 1.235 megacycle signal is applied to a frequency doubler 78 to obtain a 2.47 megacycle signal which is fed to the video sampler switch 80.

Continuous video information from the video detector 83 is amplified by a video amplifier 85 and applied to the video sampler switch 80. The video sampling switch 80 which is similar to that described with reference to Fig. 1 samples this continuous video information at a 2.47 megacycles per second rate so as to obtain video information pulses for dot presentation. The output of the sampler switch 80 is applied to the cathodes 74 and 76 of the cathode ray tube 90.

The output from the video detector 83 is also passed through a band pass filter 77 which passes the redundancy subcarrier and its side band. The output from the band pass filter 77 is fed to a synchronous demodulator 75 as described in the article "Theory of Synchronous Demodulator as Used in NTSC Color Television Receiver" by D. C. Livingston which appears in the January, 1954, issue of the Proceedings of the Institute of Radio Engineers. The 1.235 megacycle output from the controlled oscillator 68 is fed to the synchronous demodulator 75 to act as a reference signal. A positive or a negative voltage output is obtained from the synchronous demodulator 75 depending upon whether the redundancy carrier is in phase or 180° out of phase with respect to the 1.235 megacycle reference signal.

The output of the synchronous demodulator 75 is fed to a paraphase amplifier 73 such as described in "Electron Tube Circuits" by S. Seely, First edition, published by the McGraw-Hill Book Company. This amplifier provides two outputs which have opposite polarity. These outputs are connected to the control grids 98 and 99 of the electron guns 91 and 92, respectively. These two outputs from the paraphase amplifier 73 are such that only one electron gun 91 or 92 is gated on at any one instant. The redundancy signal, therefore, determines which gun 91 or 92 will be gated on at any given instant.

The operation of the receiving system shown in Fig. 4 utilizing one embodiment of our invention may be explained as follows. The two separate electron guns 91 and 92 provided within the cathode ray tube 90 produce two electron beam spots of different size but are substantially focused on the same spot on the screen of the cathode ray tube 90.

The image reproduction tube 90 is of conventional type with the exception that means are provided for generating two electron beams of different spot size and means are also provided for moving the raster scanned by one of the beams in a vertical direction. In a specific embodiment, the cathode ray tube 90 is provided with two separate electron guns 91 and 92. It is also possible to utilize a common cathode and obtain two separate beams by the use of separate control grids or to utilize only one electron gun and providing means for defocusing the beam generated from the single gun to obtain two different spot sizes.

The image presented by the cathode ray tube 90 may be explained by reference to the graphical representation shown in Fig. 5. As previously explained, the cathode ray tube 90 provides two separate electron guns 91 and 92 for producing two electron beam spots of different sizes. The electron gun 91 which excites the small size picture elements such as represented by the numbered elements in the left-hand side of Fig. 5 is provided with an electrostatic deflection system 95 which is energized by a square-wave deflection generator 97. The square-wave deflection generator 97 is synchronized so as to deflect the small spot beam from electron gun 91 vertically equal to the height of one small picture element during the vertical retrace period and hold it in this position during the scanning of that field.

The redundancy signal which is fed to the paraphase amplifier 73 determines which of the two electron guns 91 or 92 is gated on at any instance.

Fig. 5 is a graphical illustration of a portion of the face plate of the cathode ray tube 90 divided into a number of picture elements by imaginary vertical and horizontal lines for the purpose of explanation.

In the specific embodiment, 122½ scanning lines 22 and 24 are provided for each field. A 245 line coarse raster is completed in each two fields when utilizing a large size beam spot electron gun 92. A 490 line fine raster is completed every eight fields when utilizing the small beam spot size generated by electron gun 91. If it is assumed that the small spot electron gun 91 is turned on by the paraphase amplifier 73, then a dot scan raster is obtained. In the first field, the elements 1 located on line 22 are scanned by the electron beam and the cathode of the small beam electron gun 91 is gated on at a dot rate in the areas designated 1. The size of the beam spot and the distance the beam is gated on is indicated by the enclosed hatched area within the elements designated 1. This area is substantially the same form and duration as that of spots that are excited during succeeding field scans. On the next field scan, the interlacing horizontal scan will excite the areas designated 2 on the lines 24. In the third field, the electron beam will again scan the line 22 and the beam will be gated on in the elements designated 3. In a similar manner, the succeeding fields, of which there are a total of eight, are scanned in a similar manner to obtain a complete frame in eight fields. The electron beam trace of the small spot gun 91 is positioned with respect to the line 22 or 24 being scanned in each field, as indicated in Fig. 5 and also Fig. 2. The elements excited in each field are indicated as previously shown by the numbers therein. In this manner, 428 horizontal picture elements may be resolved, assuming a horizontal dot resolution factor of .707 and a 90% active horizontal scanning time.

It will be obvious to those skilled in the art that a dot pattern may be obtained by controlling the time spent on each part of the screen instead of controlling the electron flow with the sampler switch. To accomplish this, a small amplitude 2.47 megacycle horizontal deviation (ideally sawtooth) may be applied using an additional coil around the neck of the tube or additional electrostatic deflection plates. This deviation superimposed upon the normal scan will cause the electron beam to jump from picture element to picture element and thereby produce a dot pattern similar to that produced by the sampler switch.

If it is now assumed that the small beam electron gun 91 is turned off by means of the paraphase amplifier 73 and the large spot electron gun 92 is gated on, the scanning raster is as indicated on the right-hand portion of Fig. 5. The beam spot of the large beam spot electron gun 92 is of sufficient size to simultaneously excite the elements 1, 3, 5 and 7 on line 22, and when scanning line 24 the elements 2, 4, 6 and 8. For example, in scanning line 22 in field 1, the electron beam from the gun 92 excites all of the elements 1, 3, 5 and 7 in the line 22. In field 2, the beam from the electron gun 92 will excite elements 2, 4, 6 and 8 in line 24. In the third field, the beam from the electron gun 92 will again excite elements 1, 3, 5 and 7 in line 22. It is, therefore, seen that by the utilization of the large beam spot electron gun 92, there is obtained a raster of 245 scanning lines per frame which are scanned at a rate of two fields per frame and 122½ scanning lines per field.

It is thus seen that on the left side of Fig. 5, by the utilization of the dot system presentation which requires eight fields to complete a frame, there is obtained a large amount of detail definition. This large definition in detail is obtained by combining both horizontal and vertical interlace. On the right half portion of Fig. 5, the resolution is reduced in that there are only 245 scanning lines instead of substantially 490 vertical elements as in the dot system and also the maximum horizontal resolution is reduced by a factor of 2. The utilization of eight fields to provide high definition and detail in the image beam reproduced may result in objectionable flicker due to the decay time of the present phosphors which decay to substantially zero within the time required to scan two fields. However, the high definition portion of our system will only be utilized in those areas where there is high detail resulting from a difference in the brightness of adjacent picture elements while the continuous scan system will be utilized over the majority of the area of the normal picture where the shades are of low detail. It has also been found that in the presentation of moving objects, it is not necessary to have as good a definition as for a still object due to the physiological factor of the human eye. This feature is also incorporated into our invention so that where there is movement in the image or scene being televised, the continuous scan represented by the large beam spot size gun 92 is utilized regardless of the detail involved.

The device described herein is applicable to a decreased bandwidth system allowing a picture having essentially the same resolution as the conventional 525 line system to be transmitted within a 1.25 magacycles per second bandwidth. The specific frequencies set forth herein pertain to this system.

It is also obvious from the above explanation that our invention is applicable to improved definition with the present bandwidth of 4.25 megacycles per second. Our invention would allow a 100 percent increase in vertical resolution and a 41 percent increase in horizontal resolution over the conventional system. This would provide a maximum of 1016 horizontal picture elements and 1050 vertical picture elements neglecting retrace time within the standard 4.25 megacycles per second bandwidth in a compatible manner. The frequencies would be altered from the described system in that a horizontal scanning frequency of 15,750 cycles per second instead of 7350 cycles per second is used. A video sampling frequency of 8 megacycles per second is used instead of 2.47 megacycles per second while a 4 megacycles per second burst is used instead of the 1.235 megacycle burst. The low pass filter and delay mechanism must have 0–4 megacycle per second bandpass. The operation, structure and frequencies would otherwise be the same as described with reference to Figs. 1 and 4.

Referring in detail to Figs. 6 and 7, there is shown a cathode ray tube in which a horizontal and vertically interlaced picture may be presented with a minimum of flicker. The envelope of the cathode ray tube may be of any suitable type having a neck portion 101, a face plate portion 103, and an intermediate flared portion 105. The face plate 103 has a phosphor layer 102 comprised of a plurality of phosphor lines deposited in parallel strips 107 and 109. The phosphor strips 107 and 109 may be deposited in any suitable manner, such as silk screening or a photo-resist technique. The phosphor material utilized in the strips 107 and 109 is of a suitable type capable of producing light of a desired shade or color upon electron bombardment. The phosphor material utilized in the even interleaved strips 107 is of the type having a decay time of approximately 2/15 of a second. The phosphor used in the odd interleaved strips 109 has a decay time of about 1/30 of a second and may be composed of a single layer of hexagonal ZnS:Ag (0.015) mixed with hexagonal 1.3 ZnS·CdS:Ag (0.01). The phosphor used in the even interleaved strips 107 may be a cascaded phosphor composed of a layer of hexagonal ZnS:Ag(0.015) on top of hexagonal 9ZnS·CdS:CU (0.0073). The decay time may be altered by changing the proportions and preparation as described in "An Introduction to Luminescene of Solids" by H. W. Leverenz published by Wiley and Sons, Inc., 1950. The phosphors described above may be used even though their characteristics are not ideal for this application. The ideal characteristics for the phosphor material would require the phosphor to retain its brilliance at a substantially uniform level and then drop quickly to zero. The phosphors presently available to the industry do not exhibit this characteristic but decay in a substantially logarithmic manner.

A conducting transparent coating may be deposited on the face plate prior to the depositing on the phosphor layer 102 or, as shown in the specific embodiment, a thin electron conducting layer 111 of a material such as aluminum may be deposited on the back of the phosphor layer 102. The layer 111 is of a suitable thickness so as to be substantially electron permeable to the electron beam. A masking grid 113 is positioned adjacent to the face plate and substantially parallel thereto. The face place 103 and the masking grid 113 may be of curved or planar structures. The wires 115 within the masking grid 113 are parallel to each other and equally positioned. The spacing of the wires 115 is substantially equal to the width of two phosphor strips 107 or 109. The wires 115 are positioned with respect to the phosphor strips 107 and 109 so as to be substantially between each pair of strips 107 and 109.

Positioned within the neck 101 of the tube are two electron guns 117 and 119 having different electron beam trajectories. The guns 117 and 119 are positioned with respect to the masking grid 113 so that the beam from the gun 119 will excite only the short decay phosphor strips 109 while the beam from the other gun 117 will excite only the long decay phosphor strips 107. The electron gun 119 which excites the short decay time phosphor strips 109 has a spot size essentially twice as large as that of the electron gun 117 exciting the long decay phosphor strips 107. The small spot size gun 117 is provided with a pair of electrostatic deflection plates 121 so that the beam may be slightly deflected vertically to excite the desired small picture elements. Alternatively, an auxiliary electromagnetic deflection coil may be wound on the neck 101 of the tube to provide this slight deflection although the large size spot beam is also deflected in this case. The undesired deflection of the large size spot beam may be neglected or corrected by adding a correcting deflection during the time that the large spot gun is utilized.

The operation of the tube is similar to those known and utilized in color television image presentation. A similar tube for the presentation of color images is described in an article entitled "P.D.F. Chromatron" by R. Dressler, in the July 1953 issue of the Proceedings of the I.R.E., page 851. In a color television tube, three different color strips are utilized instead of two different phosphor strips having similar color light output and different decay times, as in our device. The color television tubes do not utilize a difference in beam spot size nor do they utilize an auxiliary deflection means for one of the electron beams. It will be also obvious to those skilled in the art that an image reproduction tube having a single gun may be used as long as a method of separately exciting the interleaved phosphors 107 and 109 is provided. The electron beam from a single gun tube can be defocused or vertically undulated at a high frequency rate during the excitation of the short decay phosphor strip 109 in order to produce an enlarged size spot. It is, therefore, obvious that this invention can be utilized in other type phosphor strip selecting tubes, such as the type utilizing a voltage deflection grid positioned near the face plate instead of the masking effect illustrated in the tube in Fig. 6 and also the type in which sensing signals are utilized to determine the position of the electron beams. The invention can be also utilized in the shadow mask type tube having separate guns and interspersed phosphor dots. The dots would be of different time decay instead of different color reproducing phosphors. Our invention can also be utilized using two or more separate image producing tubes having different time decay phosphors. The images from these tubes would then be superimposed to form a single composite image. This invention can also be utilized in planar cathode types of image reproducing tubes in which electrons are emitted by processes such as field emission and photoemission, as long as there is an interleaving of light producing elements having different decay or display times provided. This invention is also applicable to those type image reproducing tubes such as vacuum type, gas type, or solid state type.

Referring in detail to Figs. 6 and 7, the operation of the receiver and the scanning of the raster is similar to that described with reference to Fig. 4. The electron gun 117 which excites the small area picture elements shown in Fig. 7 is provided with electrostatic deflection plates 121 which are actuated in a similar manner as explained with respect to Fig. 4 by the square-wave deflection generator 97. The square-wave generator 97 is synchronized so as to deflect the small spot beam from the electron gun 117 vertically by the height of one picture element during the vertical retrace and hold it in position during the scanning of that field. Fig. 7 is a graphical illustration of a portion of the face plate of the display tube shown in Fig. 6, showing the interleaved strips of phosphors 107 and 109 having different decay times. The face plate 103 is shown divided into numbered picture elements by imaginary vertical lines for purposes of explanation.

The scanning system is similar to that described with respect to Fig. 4 in that 122½ scanning lines are provided for each field. A 245 line coarse raster is completed each two fields when using the large size spot gun 119. A 490 line fine raster is completed every eight fields when using the small size spot gun 117. If it is assumed that the small spot electron beam gun 117 is turned on then a dot scanning raster is obtained. In the first field, the long decay phosphor strips 107 within the upper half of the element 1 are scanned by the electron beam and the cathode of the small beam electron gun 117 is gated on at a dot rate in the upper half of the areas designated by the numeral 1. The size of the beam spot and the distance the beam is gated on is indicated for purpose of illustration by the enclosed hatched area within the elements designated 1. This area is substantially the same form and duration as that of the spots that are excited during the succeeding field scans. On the next field scan, the interlacing horizontal scan will superimpose on the strips 107 and the small beam will be gated on in the upper half of the element 2. In the third field, the electron beam will again scan the odd lines and the small beam will be gated on in the upper half of elements designated 3. In a similar manner, the succeeding fields, of which there are eight, are scanned to complete a frame. The electron beam generated by the gun 117 is moved from one of the strips 107 to the other within one line by means of the deflection plates 121 in a manner shown in Fig. 2. The elements excited in each of the succeeding fields are indicated by the numbers within the elemental areas. The masking effect of the grid 113 prevents the small beam generated from the gun 117 from exciting any of the short decay phosphors represented by the strips 109 with the elemental picture elements.

If it is now assumed that the small beam electron gun 117 is turned off and the large spot electron gun 119 is turned on, the scanning raster is as indicated in the right half portion of Fig. 7. The large beam from the gun 119 is of sufficient size to simultaneously excite the short decay phosphor strips in picture elements 1, 3, 5 and 7 when scanning line 1 or in picture elements 2, 4, 6 and 8 while scanning line 2. For example, in scanning odd lines in field 1, the large beam excites all the short decay phosphor strips 109 within elements 1, 3, 5 and 7. In field 2, the large beam generated by the gun 119 excites all the short decay phosphor strips 109 in the even lines within elements 2, 4, 6 and 8. It is, therefore, seen that by the utilization of the large beam spot gun 119, there is obtained a raster of 245 scanned lines per frame which are scanned at a rate of two fields per frame and 122½ scanning lines per field. The masking grid 115 due to the trajectory of the electron beam shadows the long decay phosphor strips 107 so as to prevent excitation of the long decay phosphor strips by means of the electron gun 119.

It may be desirable to use more than one long decay and one short decay phosphor strip or area per picture element. It may also be desirable to orient the phosphor strips at an angle with respect to the direction of scanning. Figure 11 illustrates another possible phosphor arrangement. Using this arrangement twice as many masking grid wires which are oriented parallel to the phosphor strips are required.

For the purpose of explanation, the invention is described utilizing only two interleaved phosphor strips having different decay times for displaying an image utilizing two different amounts of detail. It will be obvious that the picture may be reproduced using three or more types of light reproducing elements having three or more different phosphor decay times.

Figures 8, 9, 10:
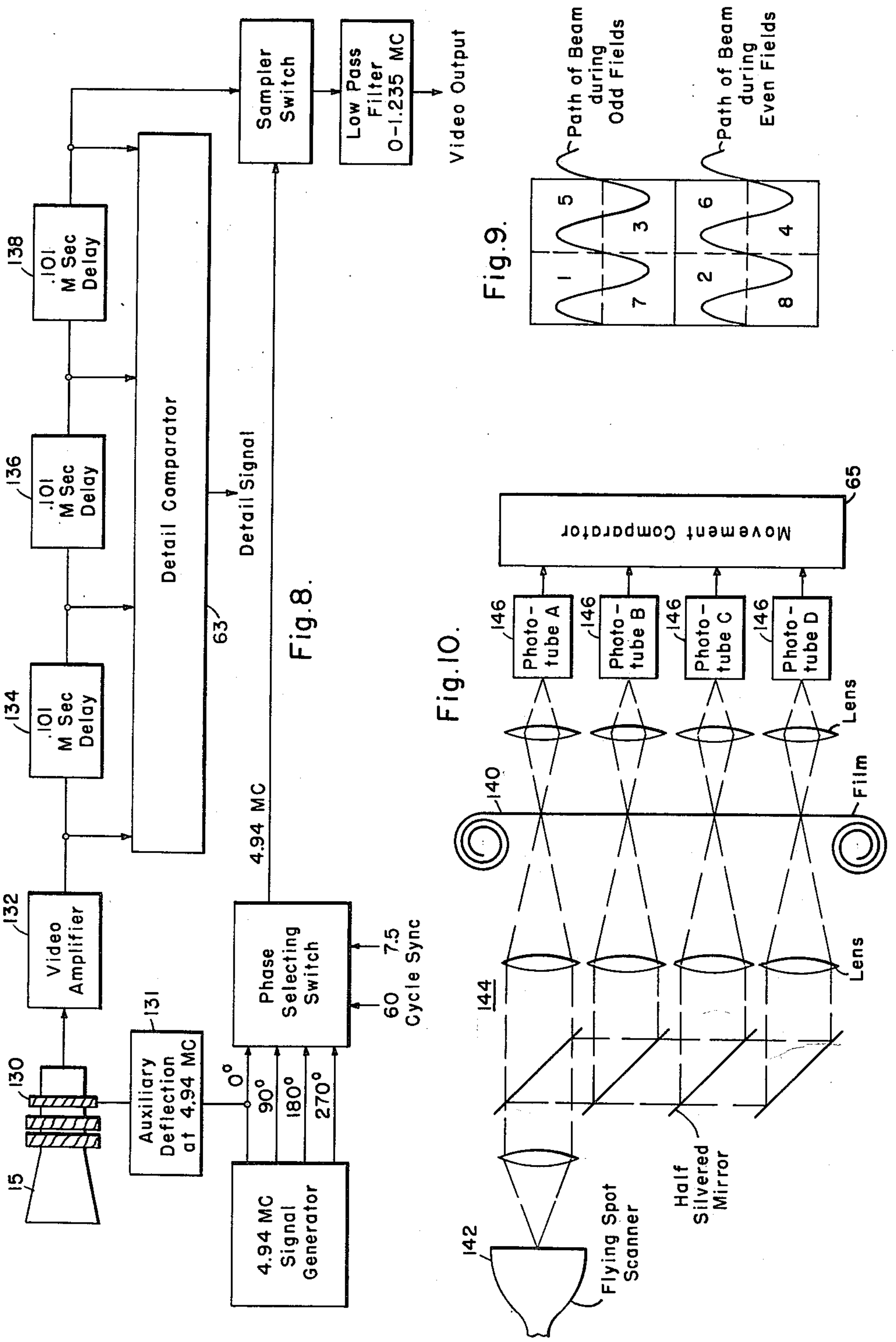
Fig. 8 is a block diagram illustrating another method of deriving a signal compatible with our system for transmission.
Fig. 9 is a graphical illustration showing the path of scanning the camera tube used in the system shown in Fig. 8.
Fig. 10 illustrates another system of deriving a signal to control the scan pattern in response to movement within the scene being televised.

Fig. 8 illustrates an alternate method for obtaining a comparison from a camera tube. A high-frequency undulation having a frequency of the order of 4.94 megacycles per second from the generator 131 is applied to an auxiliary coil 130 positioned around the neck of the camera tube 15 so as to allow a raster to be scanned in a manner as shown in Fig. 9. The video output from the camera tube 15 is fed through a video amplifier 132 and three delay lines 134, 136 and 138 to a detail comparator 63. The delay lines 134, 136 and 138 have a delay of the order of .101 micro-second. The outputs from the video amplifier 132 and the three delay lines 134, 136 and 138 are connected to the detail comparator 63 where a detail signal is derived in a similar manner as described with reference to Fig. 1.

Fig. 10 illustrates an alternate method of obtaining a movement comparison signal when util'zing motion picture film. The film 140 is synchronized at a 30 frame per second rate so that the film 140 is indexed by one frame during the vertical retrace period following each two scanning fields. The light beam for scanning the film 140 is provided from a flying spot scanner 142 which is focused on corresponding areas of four film frames simultaneously by the half silvered mirrors and lenses system 144 provided. The four light beams obtained from the system 144 are modulated by the film frames on the film 140 and converted into electrical signals by means of the phototubes 146. The output of these phototubes 146 are fed directly to a movement comparator 65 to obtain a signal if there is a difference in output as previously described with reference to Fig. 1.

While we have shown our invention in several forms, it will be obvious to those skilled in the art that it is not so limited, but is susceptible to various other changes and modifications without departing from the spirit and scope thereof.

We claim as our invention:

1. An image reproduction device comprising an image screen, said screen comprised of a plurality of elemental phosphor image forming areas, said elemental phosphor areas comprised of a first group and a second group, said second group having a decay time substantially longer than said first group, means for generating a first electron beam of a first excitation area for scanning said first group of phosphor areas and another means for generating an electron beam of a second excitation area different than said first area for scanning said second group of phosphor areas.

2. An image reproduction device comprising a screen, said screen comprised of a plurality of elemental phosphor image forming areas, said elemental phosphor areas comprised of a first group and a second group, said first group having a substantially shorter decay time than said second group of phosphor areas, means for exciting said first group of phosphor areas with a given excitation area, and another means for exciting said second group of phosphor areas with a larger excitation area.

3. A light reproduction device comprising a screen, said screen comprised of a plurality of elemental light producing display areas, said elemental display areas comprised of a first group and a second group of phosphor display areas, said first group of phosphor areas having a display time substantially longer than said second group, means for exciting said first group of light producing areas with one type of scan and another means for exciting the other group of said elemental light producing areas with a different type of scan.

References Cited in the file of this patent

UNITED STATES PATENTS

| | | |
|---|---|---|
| 2,372,903 | Lynch | Apr. 3, 1945 |
| 2,423,830 | Fonda | July 15, 1947 |
| 2,533,381 | Levy et al. | Dec. 12, 1950 |
| 2,633,547 | Law | Mar. 31, 1953 |
| 2,652,449 | Graham | Sept. 15, 1953 |
| 2,699,520 | Lubcke | Jan. 11, 1955 |
| 2,717,918 | Anderson | Sept. 13, 1955 |
| 2,784,342 | Van Overbeek | Mar. 5, 1957 |
| 2,802,753 | Crosby et al. | Aug. 13, 1957 |
| 2,806,969 | Williams et al. | Sept. 17, 1957 |
| 2,811,579 | Loughren | Oct. 29, 1957 |
| 2,831,918 | Dome | Apr. 22, 1958 |

FOREIGN PATENTS

| | | |
|---|---|---|
| 228,010 | Switzerland | July 31, 1943 |
| 713,641 | Great Britain | Aug. 18, 1954 |